United States Patent [19]

Mason

[11] Patent Number: 4,968,501

[45] Date of Patent: Nov. 6, 1990

[54] USE OF CHLOROUS ACID FOR REMOVING SULFUR DIOXIDE FROM COMBUSTION GASES

[76] Inventor: James A. Mason, P.O. Box 605, Theodore, Ala. 36590

[21] Appl. No.: 151,160

[22] Filed: Feb. 1, 1988

[51] Int. Cl.$^5$ ............................................. C01B 17/00
[52] U.S. Cl. .................................... 423/243; 423/477
[58] Field of Search .................. 423/242 R, 477, 243

[56] References Cited

U.S. PATENT DOCUMENTS 2,436,134  2/1948  Aston ................................. 423/477
2,482,891  9/1949  Aston ................................. 423/477
3,867,509  2/1975  Geiger et al. ................... 423/242 R
4,104,190  8/1978  Hartshorn ........................... 423/477

FOREIGN PATENT DOCUMENTS 2730883  1/1979  Fed. Rep. of Germany ...... 423/477

Primary Examiner—Gregory A. Heller
Attorney, Agent, or Firm—George L. Williamson

[57] ABSTRACT

The present invention describes a novel method of using chlorous acid to remove sulfur dioxide from exhaust combustion gases.

1 Claim, 1 Drawing Sheet

USE OF CHLOROUS ACID FOR REMOVING SULFUR DIOXIDE FROM COMBUSTION GASES

BACKGROUND OF THE INVENTION

This invention generally relates to the use of chlorous acid for the production of chlorine dioxide in concentrations suitable for use as an oxidizing agent in various industrial processes, more particularly, for removing sulfur dioxide from combustion gases from coal and oil fired furnaces or processes. Other industrial processes where chlorine dioxide may be used as an oxidizing agent include use as a bleaching agent in the paper industry, as a water treatment chemical in the oil recovery industry and as a treatment and disinfecting agent for treating water and/or wastewater.

Methods and/or apparatuses for removing sulfur dioxide from combustion gases have been described in the prior art. Rapson, et al, in U.S. Pat. No. 2,481,241, described a method for removing chlorine from mixtures containing chlorine dioxide and chlorine. Shaheen, in U.S. Pat. No. 3,962,112, described a composition and process for removing sulfur dioxide from combustion gases. Richter, in U.S. Pat. No. 1,685,754, described a method of recovering sulfur dioxide from waste gases. Cheng, in U.S. Pat. No. 4,312,643, described a method of removing sulfur compounds from combustion products exhaust. Fredette, in U.S. Pat. No. 4,393,035, described a method of chlorine dioxide production involving a mixture of hydrochloric and sulfuric acid feed stocks. Fredette, in U.S. Pat. No. 4,393,036 described a method of producing a mixture of sulfuric acid and hydrochloric acid feed involving chlorine dioxide generation therewith. In Bergstrum U.S. Pat. No. 4,508,593, a process for recovering sulfur dioxide was described which involved liberation thereof in the chemical pulping of lignocellulosic materials. Hanisch, et al, in U.S. Pat. No. 376,883, described a process of obtaining sulfurous acid from furnace gases or similarly composed gaseous mixtures.

However, none of the prior art cited above discloses the unique method of preparing chlorine dioxide from chlorous acid for use for the removal of sulfur dioxide from combustion gases as does the present invention.

SUMMARY OF THE INVENTION

One of the primary objectives and advantages of the present invention is that it allows for the formation of chlorous acid in an aqueous solution using bulk quantity reactants which allows for the production of a source of the chlorine dioxide off site rather than on-site at the particular industrial installation of importance. Off site production is important because it allows for a much safer generating process for chlorine dioxide whereby the risk of fire and explosion are minimized. It is anticipated that the chlorous acid would be shipped to the plant site by, e.g., tank truck or railway tank car. Furthermore, the present invention allows for the mixing and formation of the chlorine dioxide in an aqueous solution involving bulk quantities and mixing ratios which are extremely simple and basic whereby more or less generally lesser-trained personnel can accomplish the production of the chlorine dioxide. This method allows for the delivery of a source of chlorine dioxide to a plant site by merely transporting an aqueous solution by, for example, a cool or a refrigerated means which is not now done because chlorine dioxide can not be safely transported and therefore is now generally generated on-site.

According to the invention there is provided a method of forming chlorous acid in an aqueous solution from the reaction of lactic acid or citric acid with sodium chlorite to yield a salt of the acid and chlorous acid. This reaction is carried out at a pH <7 and at a temperature of <80° F., in the range of approximately, 60° F. to 80° F. The aqueous solution of chlorous acid formed from the aforementioned reaction is stable and can be safely transported by common carrier, e.g., tank truck or railway tank car, to the plant site.

The aforementioned reaction is the first of a chain of reactions leading to the production of chlorine dioxide which is eventually used for the removal of sulfur dioxide from the combustion gases. These further reactions, generally, involve the oxidation of various organic and/or inorganic compounds or desruction of microrganisms by either chlorous acid, chloric acid, chlorine dioxide or chlorine gas, or, a mixture of these chemical constituents, and will be further described by use of chemical equations in the following section of this specification.

Note that it may be feasible to substitute other alkali metal or alkaline earth metal chlorites for sodium chlorite referred to in this specification. Further note, it may be feasible to substitute other organic hydroxy acids and carboxylic acids for the lactic acid previously mentioned in this specification. For example, acids which may be substituted may include citric, malic, glycolic and tartaric acid.

Figure 1:
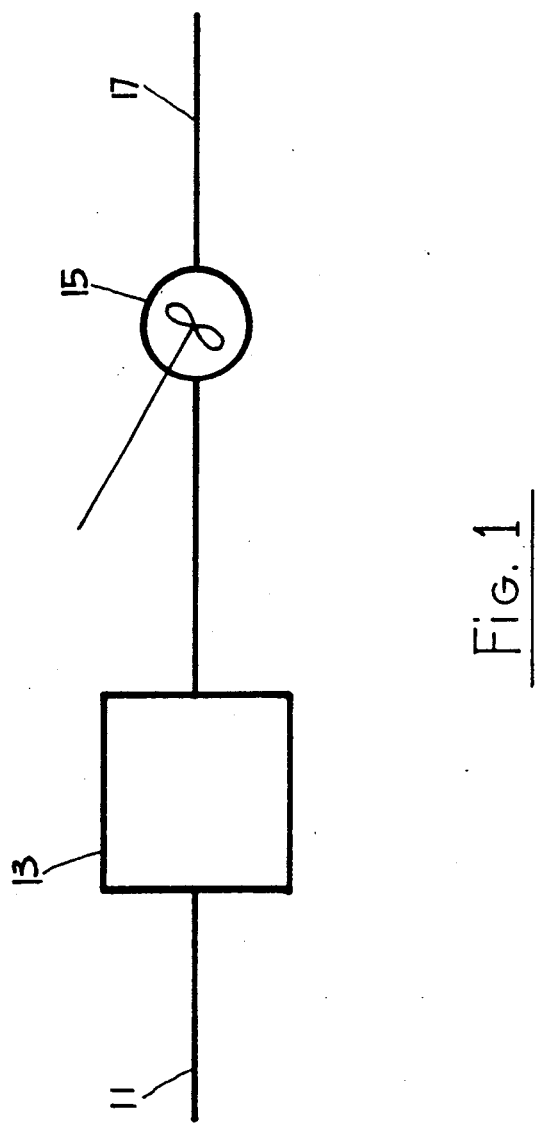
FIG. 1 is a schematic representation of one exemplary process of using the present invention.

DESCRIPTION OF USE OF CHLOROUS ACID FOR REMOVAL OF SULFUR DIOXIDE FROM COMBUSTION GASES

A more detailed description of the present invention follows in the form of chemical equations and examples.

The reactions utilized in the method of the present invention are as follows:

1. 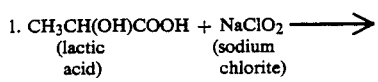
   (lactic acid) + (sodium chlorite) →

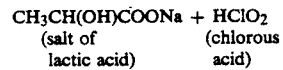
   (salt of lactic acid) + (chlorous acid)

Citric acid, HOC(CH$_2$COOH)$_2$COOH, may be substituted for Lactic Acid. Also, malic, tartaric and glycolic acid may be substituted for lactic acid.

2. a. 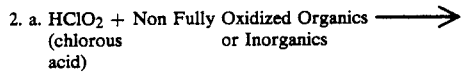
   (chlorous acid) + Non Fully Oxidized Organics or Inorganics →

HClO + Oxidized Organics or Inorganics
   (Hypochlorus acid)

b. 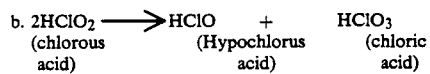
   2HClO$_2$ → HClO + HClO$_3$
   (chlorous acid) (Hypochlorus acid) (chloric acid)

(This reaction occurs in absence of chloride ion)

This reaction 2.b. is not desirable, but it will occur simultaneously with reaction 3., but not necessarily at the same rate.

$$HClO + 2HClO_2 \rightarrow 2ClO_2 + H_2O + HCl \quad (3)$$

(This reaction occurs in absence of chloride ion)

4. $ClO_2$ + Non Fully Oxidized Organics or Inorganics $\longrightarrow$ $HClO_2$ + Oxidized Organics or Inorganics Reaction 3. provides chloride ions, therefore the following reaction occurs:

$$HClO + Cl^- + H^+ \rightleftharpoons Cl_2 + H_2O \quad (5)$$

The Chlorine reaction with organics or Inorganics is generally thought to be primarily an Oxidation as follows:

$$Cl_2 + \text{Organics or Inorganics} \rightarrow \text{Oxidized Organics or Inorganics} \quad (6)$$

$$H_2O + SO_2 \rightarrow H_2SO_3 \quad (7)$$

$$4\ H_2SO_3 + 2Cl_2 \rightarrow 4H_2SO_4 + Cl_2 \quad (8)$$

$$Cl_2 + H_2O \rightarrow HCl + HClO \quad (9)$$

The above reactions are carried out at a pH less than 7.

It is believed that the oxidation and/or otherwise removal of sulfur dioxide from the exhaust combustion gases is due to chlorous acid, chloric acid, chlorine dioxide or chlorine gas, or, a mixture of these chemical constituents.

In practice, the reactants and reactions are produced by mixing bulk quantities of sodium chlorite and lactic acid. In practice, three parts of sodium chlorite at a concentration of 26% by volume are mixed with one part of lactic acid at a concentration of 88% by volume which is a food grade of lactic acid. The 26% by volume of sodium chlorite and 88% by volume of lactic acid are commonly commercially available bulk quantities of these compounds and are generally provided to industry commercially in either drum lots or bulk quantities for example tank cars or tank trucks. Furthermore, note in the above reaction Number 1. that citric acid, $HOC(CH_2COOH)_2COOH$, may be substituted for the lactic acid to produce a salt of citric acid and chlorous acid in an aqueous solution.

The above reaction Number 1. is accomplished by mixing the reactants together at atmospheric pressure in an aqueous solution with the water temperature being approximately 62° F. being in the range of 60° F. to 80° F. The higher water temperatures nearing 80° F. can be used if necessary to increase the reaction speed. Higher water temperatures may be feasible.

The aqueous solution resulting from reaction number 1 above has a density of about 1.0039, a boiling point of about 101.6° C., a freezing point of about −3° C. and a pH of approximately 4.7. The solution is completely miscible in water, has a pungent odor resembling chlorine a color of clear to slightly amber.

As can be seen, the results of the present invention can be accomplished by easily mixing on a part to part basis commonly available commercial products in commonly available commercial quantities so as to produce the desired reactions. Granulated sodium chlorite can also be used to make up the bulk quantity of this aqueous solution.

It is expected that the aqueous solution containing the chlorous acid, chlorine dioxide or mixture of these and/or other chemical constituents previously mentioned would normally be made in some type of stack, housing or vessel containing the exhaust combustion gases prior to the discharge of the gases to the atmosphere.

The above reactions produces aqueous solutions ultimately containing very high concentrations of chlorine dioxide ranging from generally 5000 ppm to 80,000 ppm. Furthermore, the chlorine dioxide produced by the present invention appears to have more oxidizing power on a per unit basis than chlorine dioxide produced by other methods.

The invention will now be described by several examples, it being understood, however, that these examples are given by way of illustration and not by way of limitation in that many changes may be effected without affecting in anyway the scope and spirit of this invention as recited in the appended claims.

EXAMPLE 1

Turning to FIG. 1, one exemplary process schematic for using the present invention to remove sulfur dioxide from combustion gases is shown. At 11, the influent of the exhaust combustion gas into the stack is shown with the stack being 13. A mixing vessel, 15, shown being the point where the addition of the aqueous solution containing the chlorous acid introduced into the exhaust combustion gases. The effluent exhaust gas discharge is shown at 17. Normally, it is expected that the aqueous solution containing the chlorous acid would be injected at the mixing vessel 15.

EXAMPLE 2

Tests were conducted in a small South Louisiana City. Ground water is pumped from a depth in excess of 1500 feet. 5 wells supply the city's total water requirements. High concentrations of $H_2S$ as evidenced by the strong sulfur taste and rotten egg smell were evident. The $H_2S$ levels tested to show 5 ppm. A 55 gal. drum of 5000 ppm $ClO_2$ solution was delivered to each well location and applied to the raw water at each wellhead at a rate of 1 part solution per M.G.D. Samples of water at each location were taken periodically over a period of 30 days. Results showed complete elimination of $H_2S$ taste and odor. A certified laboratory in South Louisiana test showed no adverse chemical effects in final water.

Assume the following:

1. Coal boiler producing 1,000,000 LB/HR of Steam
2. H, boiler feedwater to steam is 1040 BTU/LB
3. Heat of combustion for coal is 13,500 BTU/LB
4. Boiler is 85% efficient
5. Coal contains 1% sulfur

*Calculations

*1,000,000 LB/HR X 1040 BTU/LB 1.04 X $10^9$ BTU/HR

*1.04 X $10^9$ BTU/HR X 1/0.85=1.22 X $10^9$ aBTU/HR

*1.22 X $10^9$ BTU/HR X LB Coal=90,632 LB/HR

*90,632 X 0.01=906 LB/HR Sulfur

*USE 0.09% $ClO_2$ on Coal $$1. H_2O + SO_2 \rightarrow H_2SO_3 \quad (1)$$

rxn. 1. 2.a=3 to get $ClO_2$
2. $4 H_2SO_3 + 2 ClO_2 \rightarrow 4 H_2SO_4 = Cl_2$  (2)

in solution (not gas)

3. $Cl_2 + H_2O \rightarrow HCl + HClO$  (3)

I claim:

1. In a process of removing sulfur dioxide from combustion which includes injecting an aqueous solution into a vessel containing exhaust combustion gases, the improvement comprising using as the aqueous solution injected into the vessel containing said gases a mixture of (1) a salt of a hydroxy organic acid selected from the group consisting of lactic acid, citric acid, malic acid, tartaric acid and glycolic acid and (2) chlorous acid.

* * * * *